United States Patent [19]
Woodward

[11] 3,775,639
[45] Nov. 27, 1973

[54] MOTOR VEHICLE AUTOMATIC HEADLAMP SWITCHING SYSTEM

[75] Inventor: Myrneth L. Woodward, Lapel, Ind.

[73] Assignee: General Motors Corporation, Detroit, Mich.

[22] Filed: Sept. 5, 1972

[21] Appl. No.: 286,307

[52] U.S. Cl. ............... 315/83, 315/154, 315/159
[51] Int. Cl............................................ B60q 1/14
[58] Field of Search.................... 315/82, 83, 153, 315/154, 157–159

[56] References Cited
UNITED STATES PATENTS
2,850,674  9/1958  Atkins............................ 315/157 X

*Primary Examiner*—Roy Lake
*Assistant Examiner*—James B. Mullins
*Attorney*—Eugene W. Christen et al.

[57] ABSTRACT

A motor vehicle automatic headlamp switching system for automatically switching the headlamps between the high and low headlamp beams. Upon the illumination of a light sensitive element, associated control circuitry energizes the operating coil of an electrical relay which switches the headlamps from the high headlamp beams to the low headlamp beams. When the light sensitive element is no longer illuminated, the control circuit automatically deenergizes the operating coil of the electrical relay which switches the headlamps from the low headlamp beams to the high headlamp beams. Included in the control circuit is a delay circuit which prevents the control system from switching the headlamps from the high headlamp beams to the low headlamp beams upon the illumination of the light sensitive element by only short flashes of light.

3 Claims, 1 Drawing Figure

PATENTED NOV 27 1973 3,775,639
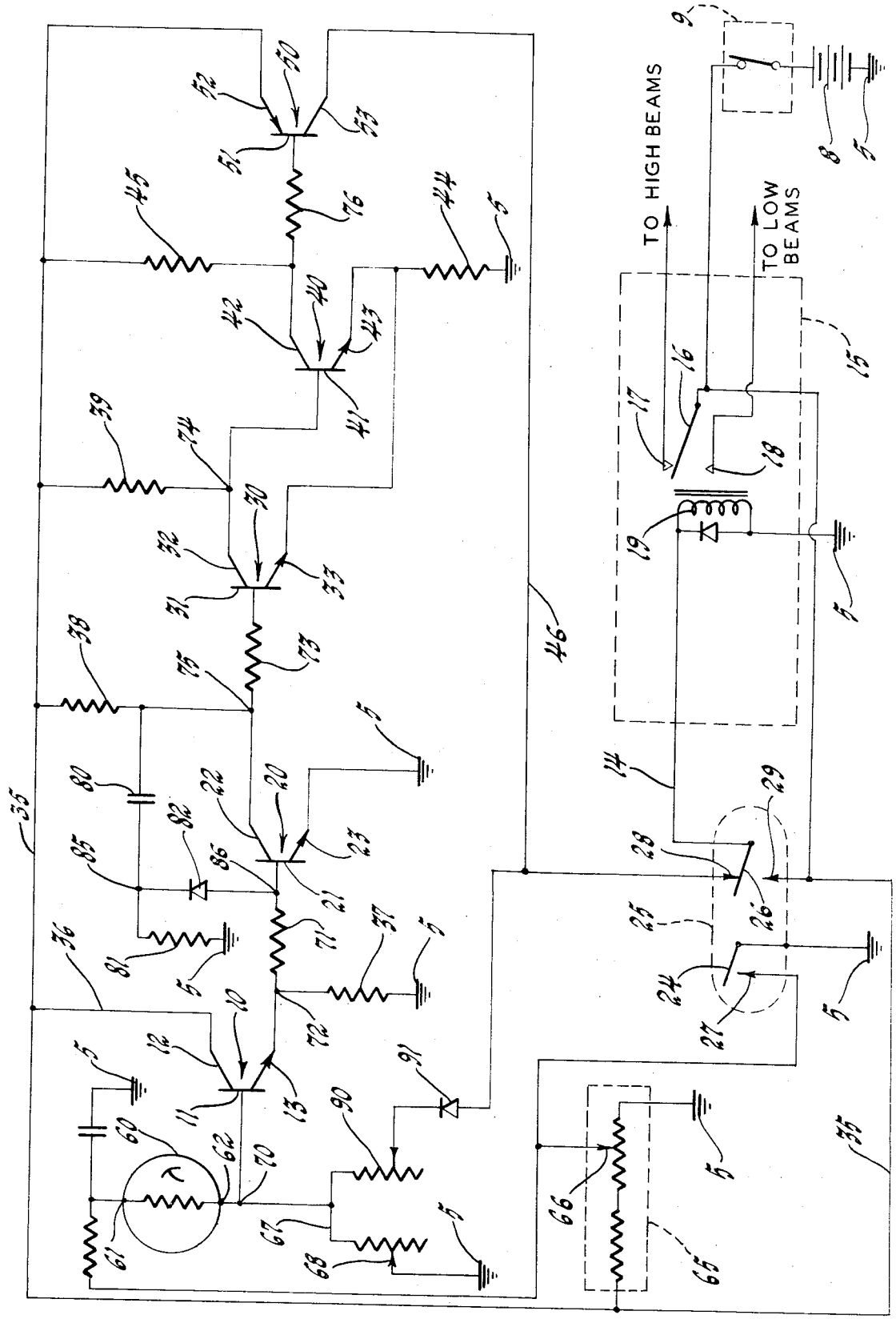

MOTOR VEHICLE AUTOMATIC HEADLAMP SWITCHING SYSTEM

This invention is directed to motor vehicle automatic headlamp switching systems for automatically switching the headlamps between the high and low headlamp beams and, more specifically, to an automatic headlamp switching system of this type which provides a one-way time delay in switching from the high headlamp beam to the low headlamp beam.

Modern motor vehicles are equipped with headlamps for illuminating the highway which may be switched between the high headlamp beams and the low headlamp beams by a foot operated electrical switch.

Frequently, motor vehicle operators neglect to switch the headlamps from the high headlamp beam in the presence of oncoming traffic. Consequently, motor vehicle automatic headlamp switching systems have been developed which, in the presence of oncoming light, automatically switch the headlamps from the high headlamp beam to the low headlamp beam, and in the absence of oncoming light, automatically switch from the low headlamp beam to the high headlamp beam. One disadvantage encountered with automatic systems of this type has been that the headlamps are switched from the high headlamp beam to the low headlamp beam in the presence of short, sporadic flashes of light, such as may be reflected from roadside signs. As this light does not persist, the system automatically quickly switches the headlamps back to the high headlamp beams causing an annoying flashing of headlights. Consequently, a one-way time delay circuit which prevents the automatic headlight switching system from switching the headlamps from the high headlamp beam to the low headlamp beam in the presence of short flashes of light is desirable.

It is, therefore, an object of this invention to provide an improved motor vehicle automatic headlamp switching system.

It is another object of this invention to provide an improved motor vehicle automatic headlamp switching system which automatically switches the headlamps from the high headlamp beam to the low headlamp beam in the presence of light and automatically switches the headlamps from the low headlamp beam to the high headlamp beam in the absence of light with a time delay circuit for preventing the automatic switching from the high headlamp beam to the low headlamp beam in the presence of short, sporadic flashes of light.

In accordance with this invention, a motor vehicle automatic headlamp switching system for automatically switching the headlamps from the high to the low headlamp beams in the presence of light and for automatically switching the headlamps from the low to the high headlamp beams in the absence of light with a delay in switching from the high to the low headlamp beams is provided wherein a control circuit establishes an energizing circuit for the operating coil of an electrical relay which automatically switches the headlamps from the high to the low headlamp beams when a light sensitive element is illuminated and which interrupts the energizing circuit for the operating coil of the electrical relay which automatically switches the headlamps from the low to the high headlamp beams when the light sensitive element is not illuminated and includes a one-way time delay circuit for preventing the automatic switching of the headlamps from the high to the low headlamp beams when the light sensitive element is illuminated by only short, sporadic flashes of light.

For a better understanding of the present invention, together with additional objects, advantages and features thereof, reference is made to the following description and accompanying single FIGURE drawing which sets forth the motor vehicle automatic headlamp switching system of this invention in schematic form.

As the point of reference or ground potential is the same point electrically throughout the system, it has been illustrated in the drawing by the accepted schematic symbol and referenced by the numeral 5.

The automatic headlamp switching system of this invention is supplied with electrical power from a source of direct current potential, such as a conventional automotive type storage battery 8, having the ususal positive and negative polarity terminals.

The negative polarity terminal of battery 8 is connected to point of reference or ground potential 5 and the positive polarity terminal of battery 8 is connected through a conventional single pole-single throw automotive type switch 9 to the movable contact 16 of an electrical relay 15 having two associated stationary contacts 17 and 18 and an operating coil 19. While in the operating condition as shown in the FIGURE with operating coil 19 unenergized and movable contact 16 maintained in electrical contact with associated stationary contact 17 by a spring member, not shown, in a manner well known in the relay art, relay 15 establishes an energizing circuit for the high headlamp beams and when operated to the alternate condition of operation upon the energization of operating coil 19 in which movable contact 16 is in electrical contact with associated stationary contact 18, relay 15 establishes an energizing circuit for the low headlamp beams.

A manually operated control and override switch 25, which may be a foot actuated switch if desired, is provided for overriding the automatic control circuit of this invention to maintain the high headlamp beams energized at all times during which the headlamp switch 9 is operated to the circuit closed condition. Movable contact 24, connected to point of reference or ground potential 5, is operated into electrical contact with associated stationary contact 27 upon each operation of the actuator, not shown, in a manner well known in the automotive art and movable contact 26, connected to operating coil 19 of relay 15 through lead 14, is of the type which remains in the last position to which it was operated, is operated into electrical contact with associated stationary contact 28, as shown in the FIGURE, or into electrical contact with stationary contact 29 with each operation of the actuator.

With headlamp switch 9 operated to the electrical circuit closed condition, the current carrying electrodes of type NPN transistor 10, collector electrode 12 and emitter electrode 13, are connected across the source of direct current potential 8 through leads 35 and 36 and through emitter resistor 37 and point of reference or ground potential 5, respectively; the current carrying electrodes of type NPN transistor 20, collector electrode 22 and emitter electrode 23, are connected across the source of direct current potential 8 through lead 35 and collector resistor 38 and point of reference or ground potential 5, respectively; the current elctrodes of type NPN transistor 30, collector electrode 32 and emitter electrode 33, are connected across the source of direct current potential 8 through lead 35 and collector resistor 39 and through common emitter resistor 44 and point of reference or ground potential 5, respectively; the current carrying electrodes of type NPN transistor 40, collector electrode 42 and emitter electrode 43, are connected across the source of direct current potential 8 through lead 35 and collector resistor 45 and through common emitter resistor 44 and point of reference or ground potential 5, respectively; and the current carrying electrodes of type PNP transistor 50, emitter electrode 52 and collector electrode 53, are connected across the source of direct current potential 8 through lead 35 and through lead 46, stationary contact 28 and movable contact 26 of switch 25, lead 14, operating coil 19 of electrical relay 15 and point of reference or ground potential 5, respectively. A light sensitive control element 60 has one contact 61 thereof connected to the movable contact 66 of potentiometer 65, one terminal of which is connected to point of reference or ground potential 5 and the other terminal of which is connected to battery 8 through lead 35, to provide electrical power to light sensitive control element 60. Potentiometer 65 functions as the sensitivity control for the automatic headlamp switching system. The other contact 62 of light sensitive control element 60 is connected to point of reference or ground potential 5 through movable contact 68 of potentiometer 67. Potentiometer 67 functions as the "hold" control or that value of light at which the system switches back to the high headlamp beam from the low headlamp beam.

Light sensitive control element 60 may be of a solid state type well known in the art having a resistance value which changes with changes of intensity of illumination. For purposes of this specification, and without intention or inference of a limitation thereto, the resistance value of light sensitive control element 60 will be assumed to decrease with increases of level of illumination. Light sensitive control element 60 is positioned upon the motor vehicle to be illuminated by light projected upon the front of the vehicle in a manner well known in the art.

With the movable contacts 24 and 26 of switch 25 operated to the "automatic" position with movable contact 24 open and movable contact 26 in electrical contact with associated stationary contact 28, as shown in the FIGURE, and a low level of illumination upon light sensitive control element 60, the resistivity of light sensitive control element 60 is high. With light sensitive control element 60 of a high resistance value, the potential upon junction 70, to which base electrode 11 of transistor 10 is connected, is of an insufficient magnitude to produce base drive current through transistor 10, consequently, this device is not conductive through the collector-emitter electrodes. With transistor 10 not conducting, the potential upon junction 72, to which base electrode 21 of transistor 20 is connected through resistor 71, is of an insufficient magnitude to produce base drive current through transistor 20, consequently, this device is also not conductive through the collector-emitter electrodes. With transistor 20 not conducting through the collector-emitter electrodes, substantially battery potential appears upon junction 75, to which base electrode 31 of transistor 30 is connected through resistor 73, which produces base drive current through transistor 30 to trigger this device conductive through the collector-emitter electrodes. With transistor 30 conducting through the collector-emitter electrodes, the potential upon junction 74, to which the base electrode 41 of transistor 40 is connected, is of an insufficient magnitude to produce base drive current through transistor 40, consequently, this device does not conduct through the collector-emitter electrodes. Not conducting transistor 40 interrupts the circuit through which emitter-base drive current may be supplied to type PNP transistor 50, consequently, this device does not conduct through the emitter-collector electrodes to interrupt the energizing circuit for operating coil 19 of electrical relay 15. Consequently, movable contact 16 of relay 15 is in electrical contact with stationary contact 17 to provide an energizing circuit for the high headlamp beams.

Upon the illumination of light sensitive control element 60 by external light projected upon the front of the vehicle, the resistance value of light sensitive control element 60 decreases. Upon a decrease of the resistance value of light sensitive control element 60, the potential appearing across junction 70 and point of reference or ground potential 5 increases in magnitude and is of a positive polarity upon junction 70 with respect to point of reference or ground potential 5. When the magnitude of this potential has increased to or greater than the base-emitter breakdown potential of transistor 10, base drive current is supplied to transistor 10 to trigger this device conductive through the collector-emitter electrodes and, therefore, current flows through emitter resistor 37. This flow of current through resistor 37 produces a direct current potential control signal across resistor 37 of a positive polarity upon junction 72 with respect to point of reference or ground potential 5 and of a magnitude substantially equal to the potential of battery 8 less the collector-emitter drop through transistor 10. That is, the circuitry including light sensitive control element 60 and amplifier transistor 10 produces a control potential signal across resistor 37 each time light sensitive control element 60 is illuminated.

The control potential signal appearing across resistor 37 is of the proper polarity relationship to produce base-emitter drive current through type PNP transistor 20 to trigger this device conductive through the collector-emitter electrodes. with transistor 20 conducting through the collector-emitter electrodes, a substantially ground potential switching signal is present upon junction 75. From this description it is apparent that transistor 20 is responsive to the control signal appearing across resistor 37 to produce a switching potential signal.

With a substantially ground potential switching signal present upon junction 75, the base electrode 31 of transistor 30 is less positive than the emitter electrode 33 thereof, consequently, transistor 30 is extinguished. With transistor 30 extinguished, the potential upon junction 74 becomes positive with respect to point of reference or ground potential 5 and is of a sufficient magnitude to produce base emitter drive current through type NPN transistor 40 to trigger this device conductive through the collector-emitter electrodes. With transistor 40 conducting through the collector-emitter electrodes, a circuit is established thereby through which emitter-base drive current is supplied to type NPN switching transistor 50 which may be traced from the positive polarity terminal of battery 8, through the headlamp switch 9, through lead 35, the emitter-base electrodes of switching transistor 50, bias resistor 76, the collector-emitter electrodes of transistor 40, common emitter resistor 44 and point of reference or ground potential 5 to the negative polarity terminal of battery 8.

The base drive current through transistor 50 upon the conduction of transistor 40 triggers this device conductive through the emitter-collector electrodes to establish an energizing circuit for operating coil 19 of relay 15 which may be traced from the positive polarity terminal of battery 8, through headlamp switch 9, lead 35, the emitter-collector electrodes of switching transistor 50, lead 46, stationary contact 28 and movable contact 26 of switch 25, lead 14, operating coil 19 and point of reference or ground potential 5 to the negative polarity terminal of battery 8.

Upon the energization of operating coil 19 of relay 15, movable contact 16 thereof is operated into electrical engagement with the associated stationary contact 18 to complete an energizing circuit for the low headlamp beams.

When light sensitive control element 60 becones unilluminated, the resistance value thereof increases and the magnitude of the potential across junction 70 and point of reference or ground potential decreases to a value which no longer supplies base-emitter drive current for transistor 10, a condition which extinguishes this device. With transistor 10 extinguished, the control signal no longer appears across resistor 37, consequently, amplifier transistor 20 also extinguishes. With transistor 20 extinguished, the potential upon junction 72 rises in a positve direction to a magnitude sufficient to produce base-emitter drive current through transistor 30 to trigger this device conductive through the collector-emitter electrodes thereof. With transistor 30 conducting, base drive current is drained from transistor 40 to extinguish this device. Extinguished transistor 40 interrupts the circuit through which emitter-base drive current is supplied to switching transistor 50, consequently, switching transistor 50 extinguishes. Extinguished transistor 50 interrupts the energizing circuit for operating coil 19 of relay 15 which permits movable contact 16 thereof to be moved into engagement with associated stationary contact 17 to establish an energizing circuit to the high headlamp beams.

To prevent the annoying switching of the headlamps between the high and low headlamp beams with short, sporadic flashes of light, a delay circuit is connected in circuit arrangement with amplifier transistor 20 which delays the conduction of transistor 20 through the collector-emitter electrodes for a predetermined period of time after light sensitive control element 60 has been illuminated. This delay circuit is comprised of capacitor 80, resistor 81 and diode 82. The series combination of capacitor 80 and resistor 81 is connected across a selected one of the current carrying electrodes of transistor 20 and the other polarity terminal of the source of direct current potential, battery 8. In the drawing, and without intention or inference of a limitation thereto, capacitor 80 and resistor 81 are connected in series across the collector electrode of transistor 20 and the negative polarity terminal of battery 8 through point of reference or ground potential 5. To complete the delay circuit, the anode electrode of diode 82 is connected to the base electrode 21 of transistor 20 and the cathode electrode of diode 82 is connected to junction 85 between capacitor 80 and resistor 81.

Upon the closure of headlamp switch 9, capacitor 80 charges through a circuit which may be traced from the positive polarity terminal of battery 8, through headlamp switch 9, lead 35, resistor 38, capacitor 80, resistor 81 and point of reference or ground potential 5 to the negative polarity terminal of battery 8. Upon the illumination of light sensitive control element 60, transistor 10 is biased conductive in a manner previously explained, consequently, junction 86 begins to go positive, a condition which tends to base bias transistor 20 conductive as previously explained. At this time, capacitor 80 tends to discharge through the collector-emitter electrodes of transistor 20 to maintain junction 75 of a positive polarity and of a sufficient magnitude to maintain base-emitter drive current through transistor 30, a condition which maintains this device conductive. At the same time, junction 85 moves more negative than junction 86 to forward bias diode 82 which conducts to prevent further positive movement of junction 86, a condition which maintains the conduction through transistor 20 at a level low enough to prevent transistor 30 from extinguishing. Consequently, transistor 40 and switching transistor 50 remain nonconductive and the upper headlamp beams remain energized. Should the flash of light which illuminated light sensitive control element 60 be shorter than the time constant of this delay circuit, the high headlamp beams remain energized through short, sporadic bursts of light illuminating light sensitive control element 60. Should light sensitive control element 60 be illuminated by a sustained light of a sufficient intensity to require the headlamp to be switched to the low headlamp beams, transistors 10 and 20 are base biased conductive for a length of time sufficient for capacitor 80 to discharge through the collector-emitter electrodes of transistor 20. When capacitor 80 has become discharged, transistor 30 is extinguished, a condition which triggers transistor 40 and switching transistor 50 conductive through the current carrying electrodes thereof in a manner previously explained to establish an energizing circuit for operating coil 19 of relay 15 which completes an energizing circuit for the low headlamp beams as previously explained.

Potentiometer 90 and diode 91 are employed for purposes of calibrating the automatic headlamp switching circuit of this invention but do not enter into the operation thereof hereinabove explained.

While specific switching devices, a specific light sensitive control element, electrical polarities and transistor types have been set forth in this specification, it is to be specifically understood that alternate switching devices and light sensitive control elements having similar electrical characteristics and alternate transistor types with compatible electrical polarities may be substituted therefor without departing from the spirit of the invention which is to be limited only within the scope of the appended claims.

What is claimed is:

1. In an automotive vehicle exterior lighting system having headlamps of the dual filament type and an electrical relay for establishing, across a source of direct current potential, an energizing circuit for one filament of each headlamp while in one operating condition and an energizing circuit for the other one filament of each headlamp when operated to the alternate condition of operation upon the energization of an associated operating coil, a control circuit for said relay comprising, circuitry including a light sensitive element positioned to be illuminated by light projected upon the front of said vehicle for producing a control signal each time said light sensitive element is illuminated, a transistor having a control electrode and two current carrying electrodes connected across the positive and negative polarity terminals of said source of direct current potential responsive to said control signal for producing a switching signal, circuit means responsive to said switching signal for establishing an energizing circuit for said operating coil of said electrical relay across said source of direct current potential, a capacitor, a resistor, a diode, means for connecting the series combination of said capacitor and said resistor across said current carrying electrodes of said transistor, and means for connecting said diode between said control electrode of said transistor and the junction between said capacitor and said resistor.

2. In an automotive vehicle exterior lighting system having headlamps of the dual filament type and an electrical relay for establishing, across a source of direct current potential, an energizing circuit for one filament of each headlamp while in one operating condition and an energizing circuit for the other one filament of each headlamp when operated to the alternate condition of operation upon the energization of an associated operating coil, a control circuit for said relay comprising, circuitry including a light sensitive element positioned to be illuminated by light projected upon the front of said vehicle for producing a control signal each time said light sensitive element is illuminated, a transistor having a base electrode and a collector electrode and an emitter electrode connected across the positive and negative polarity terminals of said source of direct current potential responsive to said control signal for producing a switching signal, circuit means responsive to said switching signal for establishing an energizing circuit for said operating coil of said electrical relay across said source of direct current potential, a capacitor, a resistor, a diode, means for connecting the series combination of said capacitor and said resistor across said collector and emitter electrodes of said transistor, and means for connecting said diode between said base electrode of said transistor and the junction between said capacitor and said resistor.

3. In an automotive vehicle exterior lighting system having headlamps of the dual filament type and an electrical relay for establishing, across a source of direct current potential, an energizing circuit for one filament of each headlamp while in one operating condition and an energizing circuit for the other one filament of each headlamp when operated to the alternate condition of operation upon the energization of an associated operating coil, a control circuit for said relay comprising, circuitry including a light sensitive element positioned to be illuminated by light projected upon the front of said vehicle for producing a control signal each time said light sensitive element is illuminated, a transistor having a base electrode and a collector electrode and an emitter electrode connected across the positive and negative polarity terminals, respectively, of said source of direct current potential responsive to said control signal applied across said base-emitter electrodes for producing a switching signal, circuit means responsive to said switching signal for establishing an energizing circuit for said operating coil of said electrical relay across said source of direct current potential, a capacitor, a resistor, a diode having anode and cathode electrodes, means for connecting the series combination of said capacitor and said resistor across said collector electrode of said transistor and the negative polarity terminal of said source of direct current potential, means for connecting said anode electrode of said diode to said base electrode of said transistor, and means for connecting said cathode electrode of said diode to the junction between said capacitor and said resistor.

* * * * *